Jan. 2, 1923.
F. B. ANDREWS.
LAWN MOWER.
FILED SEPT. 18, 1920.
1,441,141.
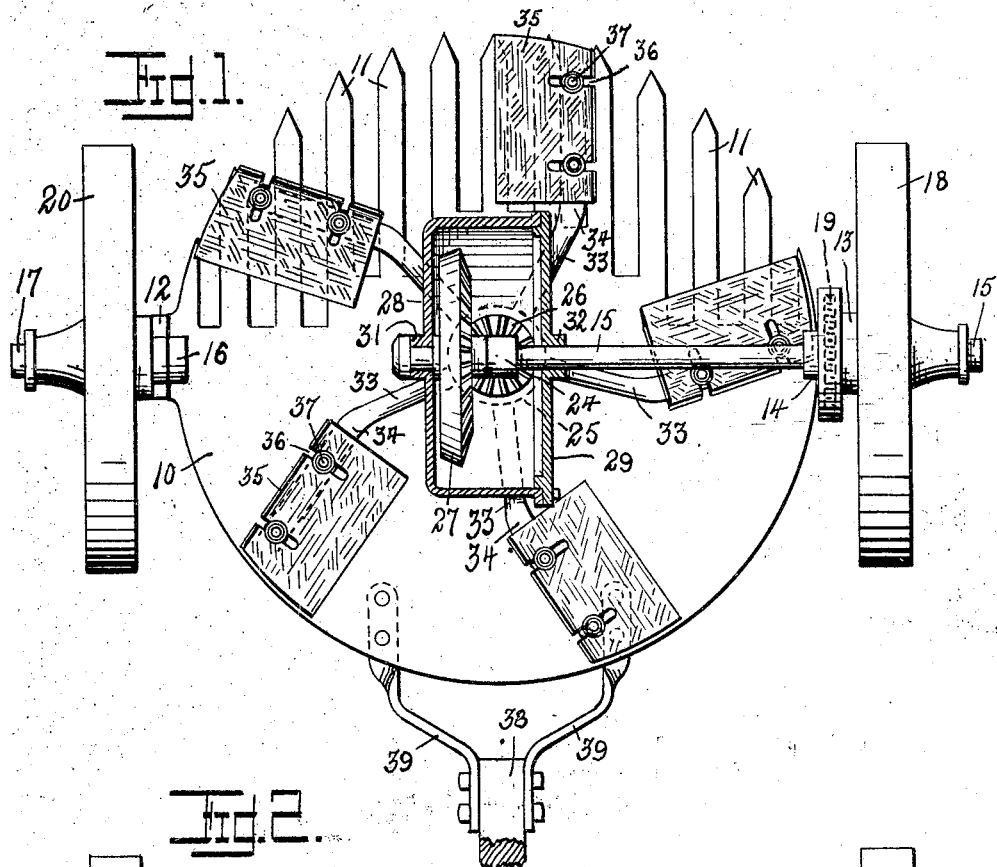
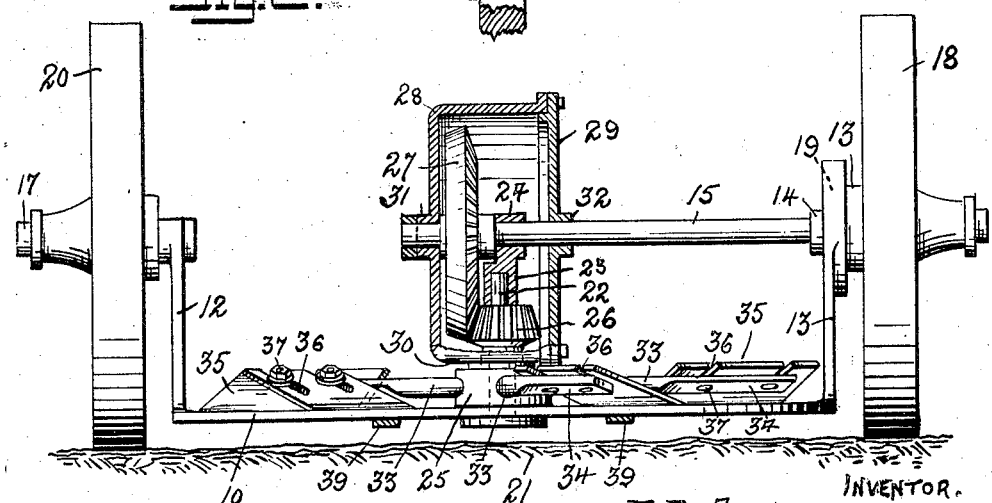
INVENTOR.
F. B. ANDREWS.
By Geo. F. Kimmel, Attorney Patented Jan. 2, 1923.

1,441,141

UNITED STATES PATENT OFFICE.

FREDERICK B. ANDREWS, OF YONKERS, NEW YORK.

LAWN MOWER.

Application filed September 18, 1920. Serial No. 411,306.

*To all whom it may concern:*

Be it known that I, FREDERICK B. ANDREWS, a citizen of the United States, residing at Yonkers, county of Westchester, and State of New York, have invented a new and useful Improvement in Lawn Mowers, of which the following is a specification.

This invention relates to lawn mowers, and has for one of its objects to simplify and improve the construction and increase the efficiency and utility of devices of this character.

Another object of the invention is to provide a device of this character including a plurality of cutting blades disposed obliquely to their line of movement, and means for adjusting the blades to control their cutting action.

With these and other objects in view, the invention consists in certain novel features of construction as hereinafter shown and described, and then specifically pointed out in the claims, and in the drawings illustrative of the preferred embodiment of the invention.

Figure 1 is a plan view, partly in section, of the improved device.

Figure 2 is a rear elevation, partly in section.

The improved device includes a base plate 10, preferably circular and with a plurality of teeth or fingers 11 at one side, the fingers extending in parallel relation with each other and with the direction of movement of the device.

Rising from diametrically opposite sides of the base are standards 12—13, the standard 13 having a bearing 14 at its upper end to support one end of a half axle 15, while the standard 12 terminates in a bearing 16 to support a stub axle 17. A combined traction and bearing wheel 18 is mounted on the journal of the axle member 15 and rotates therewith in one direction and is rotative on the axle in the opposite direction through the medium of a backing ratchet within the bearing 13, the ratchet being indicated by dotted lines at 19 in Figure 1.

A bearing wheel 20 is mounted on the journal of the stub axle 17 and coacts with the bearing wheel 18 to support the base plate 10 in parallel relation to the ground, indicated at 21.

Rigidly supported in the base member 10 is a stud 22, and mounted on the stud is a sleeve 23 having a bearing head 24 to receive the shaft 15 and form a support therefor.

Mounted for rotation on the stud 22 next to the plate 10 is a collar 25 and connected to or integral with the collar is a bevel pinion 26, the latter in mesh with a bevel gear 27 fast on the axle member 15. By this means the motion of the axle is communicated to the collar 25.

A housing or hood 28 is disposed over the gear 27 and pinion 26, and is provided with a detachable front 29.

The hood 28 is provided with a bearing 30 engaging around the hub of the pinion 26 and another bearing 31 to receive the free end of the half axle 15, while the cover 29 is also provided with a similar bearing 32 to likewise receive and support the half axle.

Radiating from the collar 25 are arms 33, the outer portions 34 of the arms being flattened and directed obliquely to the longitudinal axis of the body of the arms. The upper faces of the flattened portions 34 of the arms are directed obliquely to the upper face of the baseplate 10 and the fingers 11 form seats to support flat cutting blades 35, the latter each provided with slots 36 to receive the clamp bolts 37. By this means the blades are connected adjustably to the arms with their cutting edges operating close to the adjacent face of the plate 10 and fingers 11.

An operating handle 38 is coupled to the base plate 10 by brace members 39, to enable the device to be pushed over the lawn, and rapid rotary motion imparted to the cutting blades 35. When thus operated, the fingers 11 gather the blades of grass between them and hold them while the revolving blades 35 coact with the fingers to sever the grass blades thus held.

The action is positive and rapid and no danger exists of the clogging of the severed grass blades, as the grass is thrown rearwardly of the base plate as fast as severed, and will not, therefore, gather in masses on the plate. The cutting blades may be set at any desired angle.

The improved device can be constructed of any required size or capacity, and arranged to be horse drawn or by motor as may be required.

The preferred embodiment of the invention is disclosed in the drawings and set forth in the specification, but it will be understood that any modifications within the scope of the claim may be made in the construction without departing from the principle of the invention or sacrificing any of its advantages.

What is claimed is:—

In a device of the class described, an axle having a traction wheel, a base plate supported from said axle and having a plurality of spaced guiding fingers, an upstanding stud rigidly supported in said base plate, a holding collar rotative on said stud, a plurality of arms extending from said collar and each carrying a cutting blade operative over said fingers, a sleeve in which said axle is rotatively supported and having a downwardly directed seat to receive the upper end of said stud, and means for communicating the motion of said axle to said collar and the arms and blades carried thereby.

In testimony whereof, I affix my signature hereto.

FREDERICK B. ANDREWS.